United States Patent
Curtis

[11] Patent Number: 5,106,137
[45] Date of Patent: Apr. 21, 1992

[54] VEHICLE BUMPER WITH COMBINATION FOAM AND AIR BAG ENERGY ABSORBER

[75] Inventor: Cass V. Curtis, Dover, N.H.
[73] Assignee: Davidson Textron Inc., Dover, N.H.
[21] Appl. No.: 723,048
[22] Filed: Jun. 28, 1991
[51] Int. Cl.⁵ .............................................. B60R 19/20
[52] U.S. Cl. ..................................... 293/107; 293/109
[58] Field of Search ............... 293/107, 110, 109, 120; 267/140, 139

[56] References Cited

U.S. PATENT DOCUMENTS

| | | | |
|---|---|---|---|
| 3,494,607 | 2/1970 | Rusch | 293/109 |
| 3,514,144 | 5/1970 | Alderfer | 293/107 |
| 5,042,859 | 8/1991 | Zhang et al. | 293/107 |

FOREIGN PATENT DOCUMENTS

2303778  9/1973  Fed. Rep. of Germany ...... 293/109

*Primary Examiner*—Robert R. Song
*Attorney, Agent, or Firm*—John C. Evans

[57] ABSTRACT

A vehicle bumper assembly has a fascia covering a layer of compressible energy absorbing plastic material with a cavity formed therein; the cavity contains an inflatable bladder connected at a header plate to a fill port and an exhaust port. The exhaust port is connected to a relief valve and an orifice for controlling exhaust of gas from the inflatable bladder to control the point at which deflation of the air bag starts and the rate of deflation; the fill port is connected to a gas source operative in response to vehicle impact to generate a gas charge for inflating the bladder to fill the cavity and provide energy absorbing capacity in addition to that provided by the compressible energy absorbing plastic material. In another embodiment the bladder is preinflated to fill the cavity and the exhaust port is normally closed but responsive to vehicle impact to define an opening through valve controlling the point deflation starts and the rate of deflation to establish an energy absorption rate in addition to that of the compressible energy absorbing plastic material.

3 Claims, 2 Drawing Sheets

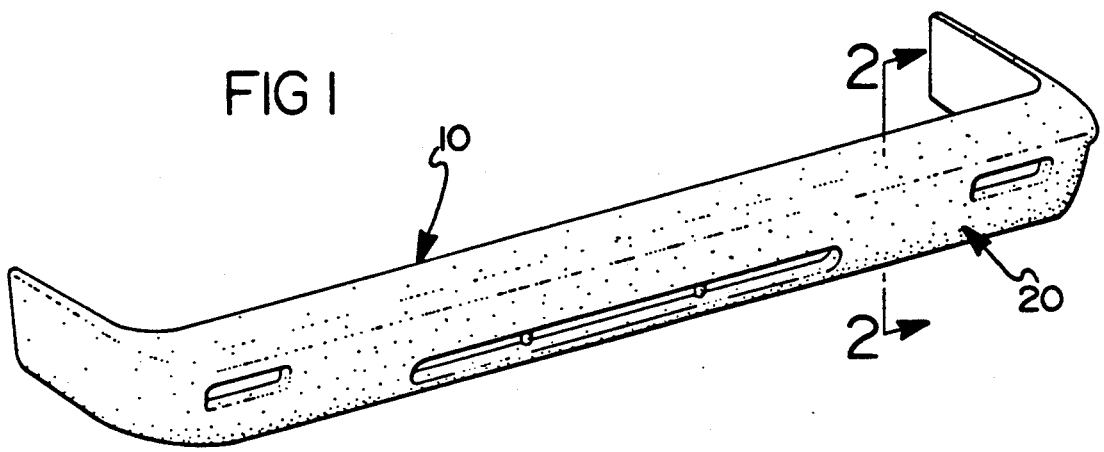
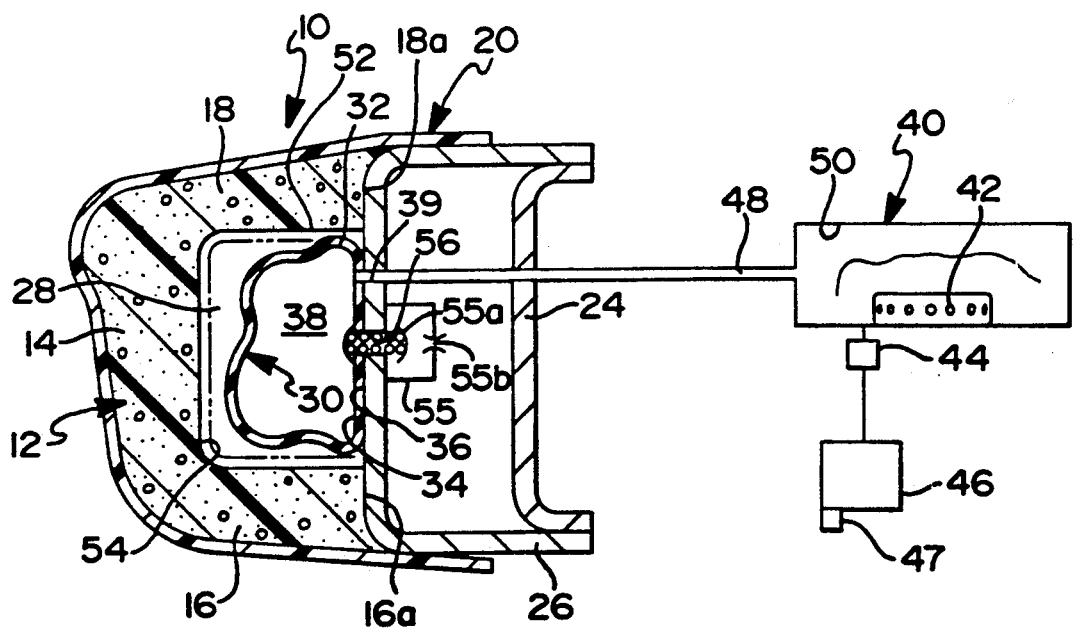

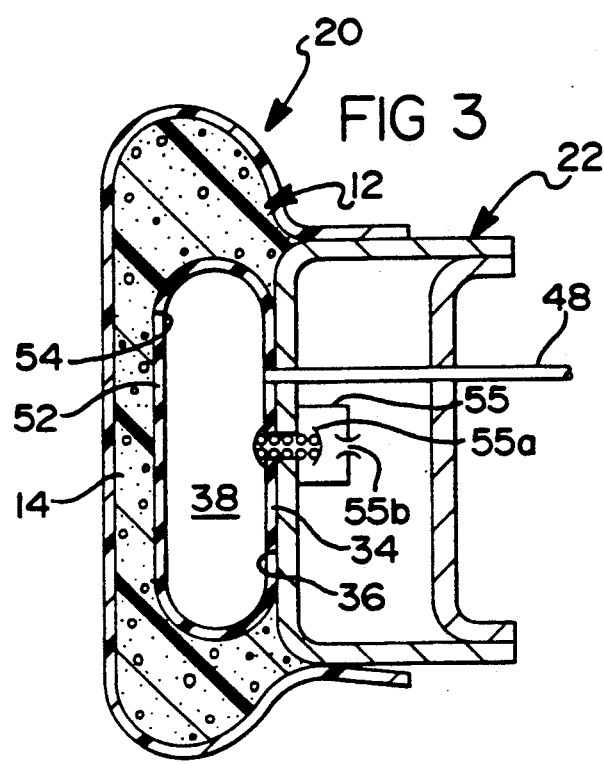
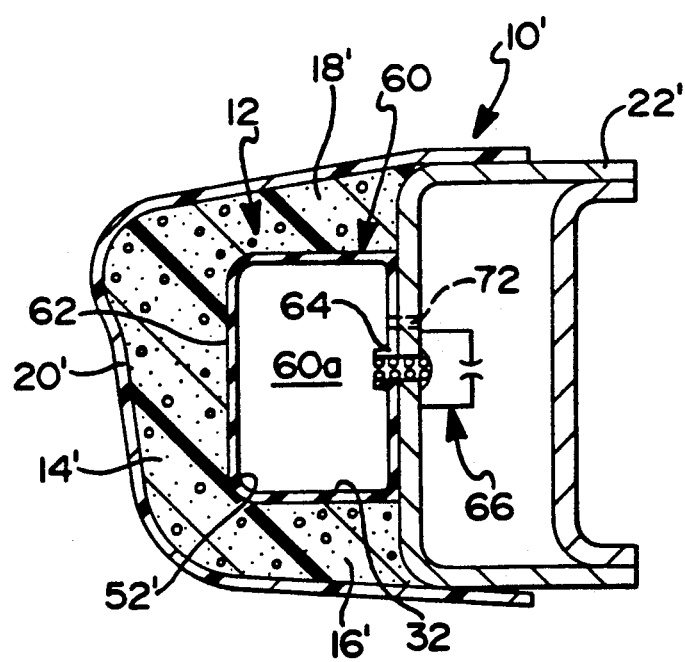

VEHICLE BUMPER WITH COMBINATION FOAM AND AIR BAG ENERGY ABSORBER

FIELD OF THE INVENTION

This invention relates to vehicle bumper systems and more particularly to vehicle bumper systems including compressible energy absorbing plastic material.

BACKGROUND OF THE INVENTION

Various proposals have been made to reduce the weight of vehicle bumpers while increasing their energy absorbing characteristics so as to eliminate or reduce damage during low impact collisions.

One approach has been to mount compressible energy absorbing plastic material on a rigid bumper beam. In order to provide secondary energy absorption in such systems it has been proposed that a collapsible plate like member be embedded in the compressible energy absorbing plastic material as shown in U.S. Pat. No. 3,856,613. While suitable for their intended purpose, such systems add weight to the vehicle and require special tooling to form the compressible energy absorbing plastic material around the components which form the collapsible plate like member.

Another approach, shown in U.S. Pat. No. 3,656,791, provides a vehicle bumper with a fascia covering an inflatable air bag. The air bag is located behind the fascia during normal use. On impact the air bag breaks through the fascia destroying it and exposing the air bag to damage as it extends beyond the fascia to be directly exposed to an impacting object. Under such modes of operation there is a high likelihood of rupture of the air bag on impact. Such rupture releases the inflatant in an uncontrolled manner such that the device no longer provides impact absorption under controlled conditions. Additionally, during normal operation there is no provision for releasing the inflatant material from the air bag to provide a controlled rate of energy absorption which will avoid damage to the bumper system.

Other prior art bumpers with an air bag component located in a position to be easily ruptured are shown in U.S. Pat. Nos. 3,971,583 and 4,176,858 wherein a hollow impact cushion 20 receives the impact force and is exposed to possible tearing or rupture. The air from the cushion 20 is forced into a rigid cylinder air tight section 20 of the bumper. The air tight section 20 is difficult to manufacture and maintain.

U.S. Pat. No. 3,695,665 discloses a shock absorbing bumper in which a hollow tubular bumper member is located. The hollow member is filled with a fluid which will be released into a hollow expandable member when the vehicle is impacted so as to absorb energy. The provision of fillable secondary containers increases the weight of the bumper system and requires elaborate piping in association with the primary bumper components.

Other approaches to provide energy absorption in vehicle bumpers are set-forth in U.S. Pat. Nos. 3,689,054; 3,822,076; 3,922,002; 3,960,397; 4,061,385; 4,215,878; and 4,706,990. None of the energy absorption systems disclosed in these patents are as pertinent as those above-discussed. Further, they do not disclose or suggest an energy absorbing system having a fascia backed by a compressible energy absorbing plastic and also an air bag operative to provide energy absorption in addition to that of the compressible energy absorbing plastic material. Nor do these patents suggest an arrangement in which a compressible energy absorbing plastic material is configured to enclose and shield an inflatable air bag system or gas bladder which is operative on vehicle impact to provide energy absorption in addition to that of the compressible energy absorbing plastic material so as to avoid damage to the vehicle under low impact conditions up to vehicle speed of 10 miles per hour.

SUMMARY OF THE INVENTION

In accordance with the present invention, a rigid bumper beam supports a front fascia of impact resistance reaction injection molded material such as a reaction injection mold high impact urethane plastic. The fascia covers a layer of compressible energy absorbing plastic material such as a urethane foam material. The layer of compressible energy absorbing material includes one or more cavities in which are located inflatable air bag(s) or gas bladder(s) which are in communication with a header plate including an inlet port and an exhaust port. The inlet port is connected to a gas generator which is operative in response to vehicle impact to inflate the air bag to conform to the layer of energy absorbing material. Impact on the fascia is progressively absorbed by compression of the layer of compressible energy absorbing plastic material followed by a controlled exhaust of gas from the inflated air bag. The layer of compressible energy absorbing plastic material will shield the air bag against rupture or tearing so that the bumper assembly is reusable.

An object and feature of the invention is to provide a light weight energy absorber assembly for use in vehicle bumpers including a core of compressible energy absorbing material which defines a cavity for protecting an air bag operative to provide energy absorption in addition to that provided by the core.

A further feature of the present invention is to provide for such a light weight energy absorber in which the air bag is a normally deflated air bag and in which a gas generator is operative to inflate the air bag on vehicle impact to conform to the cavity to provide energy absorption in addition to that of the absorbing capacity of the core.

A still further feature of the present invention is to provide a light weight two component energy absorber in which the first component is a compressible energy absorbing material having a cavity therein for protecting the second component and wherein the second component is a normally inflated air bag which conforms to the cavity to provide energy absorption in addition to that of the energy absorbing capacity of the first component.

Other objects and attendant advantages of the present invention will be readily appreciated as the same becomes better understood by reference to the following detailed description when considered in connection with the accompanying drawings wherein:

BRIEF DESCRIPTION OF THE DRAWINGS

FIG. 1 is a perspective view of a vehicle bumper including the present invention;

FIG. 2 is a sectional view taken along the line 2—2 of FIG. 1 looking in the direction of the arrows;

FIG. 3 is a view like FIG. 2 showing the vehicle bumper following impact; and

FIG. 4 is a view like FIG. 2 showing another embodiment of the present invention.

DETAILED DESCRIPTION OF PREFERRED EMBODIMENTS OF THE INVENTION

Referring now to the drawings, alternative embodiments of an energy absorbing article are shown in the form of a vehicle bumper generally indicated at 10 and 10'. The bumpers 10 and 10' include a first energy absorbing core 12 of compressible energy absorbing plastic, preferably of urethane foam. As best shown in FIGS. 2 and 4, the core 12 includes a front wall 14 defining a frontal surface. Upper and lower extensions 16, 18 on core 12 combine with the frontal surface on wall 14 to support an outer fascia 20 of a high impact resistance plastic such as reaction injection molded urethane material. The fascia 20 covers the energy absorbing core 12 and provides an aesthetically pleasing bumper surface that can be colored or styled to contours matching the styling of an associated vehicle.

In the past such bumpers had energy absorbing characteristics limited to the physical dimensions of the core 12 and to its energy absorbing characteristics. In such cases vehicle impacts were transferred from the vehicle bumper into a bumper beam assembly 22 and thence through fittings (not shown) into the vehicle frame. In prior systems the limited capacity of the compressible energy absorbing foam resulted in vehicle damage at impacts resulting from vehicle speeds in the 5 to 10 mile speed range. In the vehicle bumper 10 shown in FIGS. 1-3, the bumper beam assembly 22 is formed as a cross-beam 24 which extends across the width of a vehicle. The cross-beam 24 is joined to a U-frame member 26 which strengthens the bumper for supporting the outer fascia 20 and the core 12.

In accordance with the present invention the energy absorbing core is a microcellular polyurethane foam formed by mixing a pre-polymer system with a catalyst system. Examples of such foams are set forth in U.S. Pat. Nos. 3,575,896; 3,852,140 and 3,893,727. The core 12 is characterized by an interior cavity 28 located behind the front wall 14. The cavity has interior walls 28a partially enclosing a second energy absorbing component 30. The second energy absorbing component 30 is a gas bag such as a normally deflated air bag or bladder 32 which has an open end 34 thereon sealed to the front surface 36 of the U-frame member 26. The interior 38 of the air bag 32 is in communication with a fill port 39. The fill port 39 is adapted to be connected to a gas source 40. In the illustrated embodiments, the gas source is includes a gas generator 42 having an igniter 44 connected to a suitable control system 46 including a transducer 47 that will sense vehicle impact and condition the control system 46 such that it will generate a signal upon vehicle impact above a preselected level, viz. impacts that occur from above 2 mph vehicle speed. The signal operates the igniter 44 to cause the gas generator 42 to produce a charge of gas which will be directed through a supply tube 48 connected at its opposite ends to the housing 50 of the gas source 40 and to an inlet fitting at the fill port 38. The air bag has an inflated volume which will locate an outer expanded surface 52 of the air bag 32 against the inner surface 54 of the cavity 28 in the first energy absorbing component 12.

The inflated air bag 32 and the core 12 define a two stage energy absorbing strut. The air bag 32 becomes an extension of the first energy absorbing component defined by the core 12 whose physical dimensions including those of the front wall 14 and the upper and lower extensions 16, 18 and the properties of the foam itself determine a first energy absorbing capacity. By virtue of the arrangement, energy is absorbed by collapsing and compressing the cells of the foam in core 12. During initial impact, the air bag 32 and engagement between the core extensions 16, 18 at ends 16a, 18a thereof with the front surface 36 maintains the air bag fully inflated. The air bag 32 thereby supports the core 12 during initial impact which compresses the cells cells of the core 12 to provide a first level of energy absorption. The inflated volume of air bag 32 is held only for milliseconds following impact. Then the core 12 directs the impact force against the expanded surface 52 to push inwardly against the air bag 32. Pressure increase in the air bag 32 will act on a control valve 55 to open it so that the inflatant is exhausted through an exhaust port 56 in the U-shaped frame member 26. The valve 55 includes a relief valve 55a which will deflect and provide exhaust through an orifice 55b so as to control the point that air bag deflation starts and the rate of its deflation. The controlled exhaust of the inflatant from the air bag 32 serves to produce an energy absorption in addition to that of the core 12. The energy absorbed during compression of the foam material in the core 12 when backed by the inflated bag and the additional energy absorbed by the collapse of the air bag 32 combine to reduce vehicle damage during vehicle velocity impacts produced at vehicle speeds of 10 mph. The relief pressure of valve 55a can be selected such that there is a delay period in milliseconds, following inflation, before the air bag is pressure relieved.

The embodiment of the invention shown in FIG. 4 includes the vehicle bumper 10' in which components corresponding to those shown in the embodiment of FIGS. 1-3 are identified with corresponding reference numerals primed. In this embodiment, the air bag 32 is replaced by a preinflated air bag 60 which is inflated at all times such that its outer surface 62 will conform to the walls or inner surface 52' of the cavity 32'. In this embodiment the inflated bag has an outlet 64 connected to a valve assembly 66 having a relief component 68 that opens when the bumper is impacted. Following such impact the valve assembly 66 includes a relief valve orifice 70 which will control the rate of exhaust to provide the additional energy absorption as in the first embodiment. In this embodiment, the fitting 64 also connects to a filler port 72 to which a gas source can be connected for directing inflatant into the interior 60a of air bag 60 following impact and collapse. The air bag 60, when recharged, will inflate so that its outer surface 62 will return to a shape which corresponds to the cavity 32'. Return to preimpact shape will reshape the compressible foam component 12' and the fascia 20 so that it is reusable.

The invention has been described in an illustrative manner, and it is to be understood that the terminology which has been used is intended to be in the nature of words of description rather than of limitation.

Obviously, many modifications and variations of the present invention are possible in light of the above teachings. It is therefore, to be understood that within the scope of the appended claims the invention may be practiced otherwise than as specifically described.

What is claimed is:

1. In an energy absorbing bumper assembly having a flexible fascia for providing a styling appearance and a rigid bumper beam for connection to the frame of a vehicle and including a core of compressible foam plastic material having a frontal surface forming a support for said flexible fascia and including an interior cavity with interior walls behind said frontal surface the improvement comprising:

a deflated gas bag located in said cavity and including an inflated shaped conformable to said interior walls of said interior cavity for capturing said core between said flexible fascia and said gas bag;

a gas source including a gas generator and a housing surrounding said gas generator; a tube connecting said housing to said deflated gas bag for inflating said gas bag only upon energization of said gas generator;

said core responsive to a predetermined vehicle impact when said gas bag is deflated to cause cells of said core to compress to absorb a first level of energy;

means responsive to said predetermined vehicle impact for initially inflating said gas bag only following said predetermined vehicle impact to cause it to conform to said cavity;

means in association with said gas bag for maintaining the inflatant pressure in said gas bag for holding the shape of said gas bag in its conformed relationship to said cavity for a predetermined delay period during which said cells of said core are compressed;

and means for controlling exhaust of fluid from said gas bag following the predetermined delay period for producing a second level of energy absorption in addition to said first level of energy absorption.

2. The energy absorbing bumper assembly of claim 1, further characterized by: said means for maintaining the inflatant pressure being a pressure relief valve and said means for controlling exhaust of fluid being an orifice in series flow relationship with said pressure relief valve.

3. In an energy absorbing bumper assembly having a flexible fascia for providing a styling appearance and a rigid bumper beam for connection to the frame of a vehicle and including a core of compressible foam plastic material having a frontal surface forming a support for said flexible fascia and including an interior cavity with interior walls behind said frontal surface the improvement comprising:

a deflated gas bag located in said cavity and including an inflated shape corresponding to said interior cavity for capturing said core between said flexible fascia and said inflated gas bag, a gas source including a gas generator and a housing surrounding said gas generator; a tube connecting said housing to said deflated gas bag for inflating said gas bag only upon energization of said gas generator;

said core responsive to a predetermined vehicle impact when said gas bag is inflated to cause cells of said core to compress to absorb a first level of energy;

said rigid bumper beam having first and second fluid flow ports therein and said inflatable gas bag having an inlet end thereon communicating said first and second fluid flow ports with the interior of said gas bag;

means in association with said first fluid flow port for directing inflatant from said tube into said gas bag only upon said predetermined vehicle impact for causing said gas bag to assume its inflated shaped to conform to the shape of said cavity to support said core during absorption of said first level of energy; and means in association with said second fluid flow port for controlling exhaust of fluid from said gas bag following absorption of said first level of energy to produce a second level of energy absorption in addition to said first level of energy absorption.

* * * * *